July 4, 1961  J. H. HETT  2,990,830
MEDICAL INSTRUMENT WITH FOCUSING TELESCOPE
Filed Nov. 30, 1959
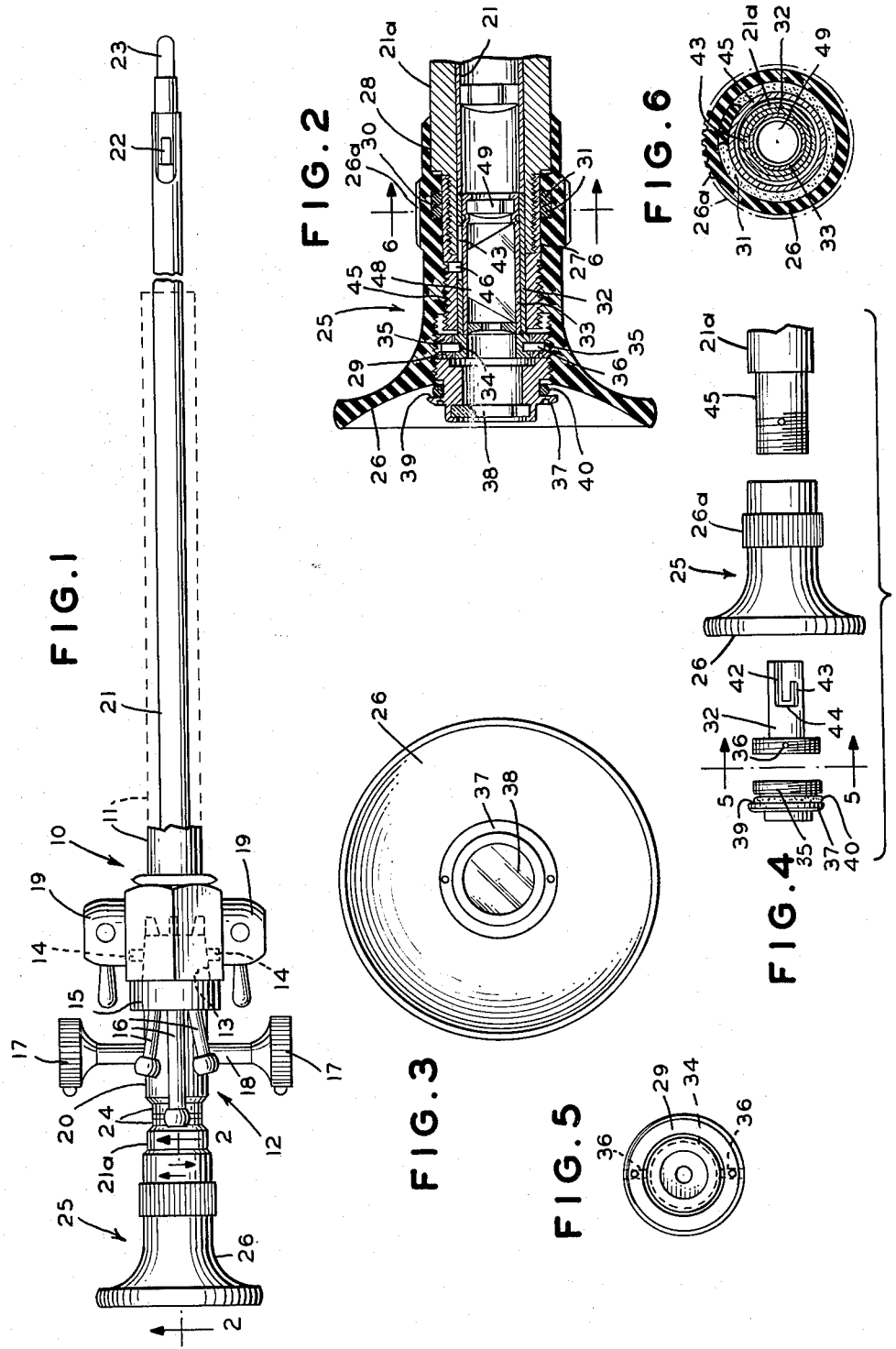

United States Patent Office 2,990,830
Patented July 4, 1961

2,990,830
MEDICAL INSTRUMENT WITH FOCUSING TELESCOPE
John H. Hett, Englewood, N.J., assignor to American Cystoscope Makers, Inc., Pelham Manor, N.Y., a corporation of New York
Filed Nov. 30, 1959, Ser. No. 856,045
4 Claims. (Cl. 128—4)

This invention relates to medical and surgical instruments which include telescopes and more particularly to such instruments in which the focus of the telescope may be adjusted at will and which are especially well suited for use where a relatively large volume of fluid may be encountered, e.g. when an irrigating fluid is injected during a surgical procedure into the body of a patient.

The exacting requirements of medical instruments, particularly those utilized in conjunction with the performance of examinations or surgery within the body of a patient are well known. A great variety of optical instruments have hitherto been provided in keeping with these exacting standards which make possible the visualization of even relatively inaccessible internal areas. The extreme criticality of the performance requirements imposed upon such instruments may be readily appreciated when it is borne in mind that mechanical defects which might result in the distortion or obscuring of the area under view when a surgical procedure is being carried out may well result in irreparable damage and even in the loss of the life of the patient. Thus, the highest possible standards must be met by optical instruments particularly as to their capability of withstanding the leakage of fluids into their interior which would tend to interfere with and distort the image of the area under view provided at the eyepiece. While devices have long been known by means of which optical instruments such as telescopes may be focused, efforts along this line in the field of medical or surgical instruments have left much to be desired.

It is therefore a principal object of this invention to provide an improved medical or surgical instrument embodying an optical system as well as an improved optical instrument especially well adapted for use with medical or surgical instruments particularly in the visualization of areas undergoing a surgical procedure where a substantial amount of fluid may be encountered. It is a more specific object of this invention to provide an optical telescope the focus of which may be adjusted at will through a relatively wide range and which is constructed to withstand to an enhanced degree leakage of water or other fluids.

Further objects as well as advantages of the present invention will be apparent from the following description of a preferred embodiment thereof and the accompanying drawing in which FIGURE 1 is an elevational view of a surgical instrument embodying the present invention;

FIGURE 2 is a sectional view along line 2—2 of FIGURE 1 showing the construction of the focusing eyepiece of the telescope;

FIGURE 3 is an elevational view showing the proximal end of the eyepiece;

FIGURE 4 is an exploded view showing the parts of the eyepiece apart from the remainder of the telescope;

FIGURE 5 is an elevational view of the proximal end of one of the members of the eyepiece assembly and taken from the point of view of the line 5—5 of FIGURE 4 in the direction indicated by the arrows; and FIGURE 6 is a sectional view through the line 6—6 of FIGURE 2.

Referring now to the drawing, surgical instrument 10, in the present instance an endoscope, comprises a sheath 11 provided at its proximal end with an internal, conically tapered surface adapted to receive and lock in place a telescope and catheter guide assembly indicated generally at 12. The assembly 12 is provided adjacent to its proximal end with a mounting block 15 having a conical seating member 13 fitted with two lock pins 14 adapted to be received and locked in slots provided in the tapered surface of the sheath. Hollow guides 16 communicate with passageways formed through the mounting block 15 and provide access for catheters or other instruments which may be inserted for use. The deflector control knobs 17 mounted on shaft 18 provide for control of the distal end of a device such as the aforementioned catheters in a manner which is well known in the art and the details of which form no part of the present invention. The sheath 11 may also be provided with conduits for irrigating or other fluids, the flow of which is controlled by stopcocks 19.

The telescope comprises a tubular barrel 21 supported in housing 20 which extends through the mounting block 15 and along the sheath 11. An objective lens 22 is mounted adjacent to the distal end of barrel 21 which may also support a lamp 23. Suitable wire conductors (not shown) extend along the barrel 21 and are connected to two insulatedly mounted contact rings 24.

As most clearly shown in FIGURE 2, the proximal end of the barrel 21 has an adapter 21a fixed thereto and extends within an eyepiece assembly 25 adapted for manual rotation relative to the barrel 21 as will now be described. Eyepice assembly 25 comprises an eyepice 26 provided with a knurled or otherwise roughened external annular band 26a to facilitate rotation of the eyepiece 26 relative to the barrel 21. Internally, the eyepice 26 is provided with a central bore 27 which communicates at one end with a bore 28 and at its other end with a bore 29. Both the bores 28, 29 are somewhat larger in diameter than the bore 27. Adjacent to the bore 29 the surface of bore 27 is threaded to receive a member yet to be described. Adjacent to bore 28 the wall defining the central bore 27 is recessed to receive annular sealing members. Preferably a single annularly extending recess 30 is provided having a sufficient axial extent to receive two O-rings 31 in side-by-side relation and of such depth that the O-rings 31 project radially inward therefrom unless compressed.

Extending axially within the central bore 27 and projecting into bore 29 is a sleeve 32 adapted to receive an ocular setting member 33 and having an annular groove or race 34 formed about the end thereof which extends in the bore 29. An externally threaded ring 35 is rotatably mounted on and secured to sleeve 32 by means of pins 36 carried by the ring 35 and projecting into the race 34. The surface of bore 29 is threaded to engage with the ring 35 and the latter after being threaded into the eyepiece 26 is locked in the desired zero position by means of an outer member 37 which also functions as a setting for a planar optical glass member 38. The outer member 37 is generally ring shaped and is externally threaded for engagement in the thread formed in the wall of bore 29. The outer or proximal end of the member 37 is provided with an annular groove 39 in which an O-ring 40 is seated. O-ring 40 is formed of rubber or other suitably inert, resilient material which will provide the desired seal against leakages and is dimensioned so that when member 37 is screwed into the eyepiece 26 and in locking engagement with the ring 35, the O-ring is clamped so as to be compressed and provide an effectively liquid tight seal between the member 37 and the eyepiece 26.

As most clearly shown in FIGURE 4, sleeve 32 has a slot 42 extending longitudinally therealong from the end thereof remote from ring 35 and presented toward bore 28. A second but blind slot 43 extends in parallel spaced relation with a portion of slot 42 and the inner ends of the two slots are joined by and communicate through a third slot 44 which extends between them and circumferentially along sleeve 32.

A second sleeve 45 extends in bore 27 between sleeve 32 and the internal wall of eyepiece 26 and has fixed thereto a radially inwardly projecting pin 46. Sleeve 45 is externally threaded as indicated and is screwed into the mating thread formed in the wall of bore 27 adjacent to bore 29. As shown in FIGURE 2, pin 46 extends in slot 43 in normal use while slots 42 and 44 are provided and facilitate assembly of the unit. The end portion of sleeve 45 adjacent to bore 28 overlies and closes annular recess 30. O-rings 31 are formed of resilient material as described in connection with O-ring 40 and are so dimensioned as to be compressed and deformed when sleeve 45 is in place to provide a liquid tight, rotating seal with the juxtaposed external surface of sleeve 45 and internal surface of eyepiece 26. The internal surface of sleeve 45 presented toward bore 28 is threaded for engagement with the proximal or eyepiece end of barrel 21.

The eyepiece assembly 25 is readily assembled, as indicated in FIGURE 4, by inserting sleeve 45 through the right hand or distal end and sleeve 32 through the left hand or proximal end of the eyepiece 26 so that pin 46 carried by sleeve 45 extends in the open ended slot 42 formed in sleeve 32 and then threading sleeve 45 and ring 35 in their respective threads in the eyepiece. When pin 46 is in alignment with the cross slot 44, the body of sleeve 32 is rotated relative to sleeve 45 to carry the blind slot 43 into registration with pin 46. Now the ring 35 is rotated to carry sleeve 32 to the left until pin 46 is located about midway along the length of slot 43 which is the preferred neutral or zero setting. With sleeves 32 and 45 thus positioned, the outer member 37 is threaded into eyepiece 26 into locking engagement with ring 35 and to deform O-ring 40 to provide the desired seal at that end. The eyepiece assembly is threaded onto the adapter 21a of barrel 21 to complete the assembly a suitable sealing agent having first been applied to insure a watertight seal between the barrel and the sleeve 45. The threaded engagement between sleeve 45 and eyepiece 26 is such as to permit relative rotation between them in both directions. In other words, with the parts as shown in FIGURE 2 and viewed from the left, eyepiece 26 may be rotated both clockwise and counterclockwise relative to sleeve 45 which is fixed to the barrel 21.

It will be understood that prior to the mounting of the parts of the eyepiece assembly the desired lenses such as prism 48 and ocular lens 49 have been mounted in tubular setting 33 and the latter is suitably sealed in sleeve 32. Prism 48 may be a single correcting prism.

In use, eyepiece 26 is readily manually rotated to adjust the optical front conjugate distance of the eyepiece system. Rotation of the eyepiece in one direction or the other while the remainder of the telescope is held against motion serves to add or subtract as the case may be, about 4 diopters in a practical embodiment. It is to be noted that rotation of the eyepiece does not rotate the eyepiece lens and prism but only serves to shift them linearly with respect to the last focal plane of the telescope barrel. The construction of the eyepiece thus enables both near-sighted and far-sighted operators, having eyes with reduced powers of accommodation, to obtain a more precise view of the entire field without eyestrain. This improvement in visualization makes it unnecessary for such operators to use eyeglasses and they are thereby freed from the drawbacks which accompany the use of eyeglasses when working with such instruments. Further, the construction of the eyepiece assembly is such that even under such extremely adverse conditions as may be encountered during a surgical procedure when irrigating fluids are being pumped through the sheath 21, the lens element and the internal spaces therebetween remain free of moisture.

The terms and expressions which have been employed are used as terms of description and not of limitation, and there is no intention, in the use of such terms and expressions of excluding any equivalents of the features shown and described or portions thereof, but it is recognized that various modifications are possible within the scope of the invention claimed.

What is claimed is:

1. In a medical instrument, an elongated tubular sheath adapted for insertion into a cavity in the body of a patient, an elongated telescope barrel connected to and extending in said sheath, said telescope barrel having a lens system mounted therein, a tubular eyepiece, means connecting said eyepiece and the proximal end of said telescope barrel in fluid-tight sealed relation with said eyepiece displaceable longitudinally relative to said telescope barrel, a tubular sleeve mounted in and longitudinally displaceable with said eyepiece, said tubular sleeve being juxtaposed to the proximal end of said telescope barrel, and means including an ocular setting fixed within said tubular sleeve and positioned to receive light rays from the lens system in said telescope barrel, whereby displacement of said eyepiece toward and away from said telescope barrel varies the optical front conjugate distance of the eyepiece system.

2. In a medical instrument, an elongated tubular sheath adapted for insertion into a cavity in the body of a patient, an elongated telescope barrel connected to and extending in said sheath, said telescope barrel having a lens system mounted therein, a first tubular sleeve connected in sealed relation with and forming an extension of the proximal end of said telescope barrel, a tubular eyepiece mounted on and surrounding said first tubular sleeve and longitudinally displaceable relative to the same, a second tubular sleeve mounted in and longitudinally slideable relative to said first sleeve, means connecting said second sleeve with said eyepiece so that longitudinal movement of said eyepiece displaces said second tubular sleeve longitudinally, means including an ocular setting fixed within said second sleeve and positioned to receive light rays from the lens system in said telescope barrel, and means connecting said eyepiece and said first tubular sleeve in fluid-tight sealed relation while leaving said eyepiece free to be displaced longitudinally relative to said first tubular sleeve.

3. In a medical instrument, an elongated tubular sheath adapted for insertion into a cavity in the body of a patient, an elongated telescope barrel connected to and extending in said sheath, said telescope barrel having a lens system mounted therein, a first tubular sleeve connected in sealed relation with and forming an extension of the proximal end of said telescope barrel, said first sleeve extending externally of the proximal end of said sheath, a tubular eyepiece surrounding and in threaded engagement with said first sleeve, rotation of said eyepiece serving to longitudinally displace the same relative to said first sleeve, a pair of annular resilient members positioned between juxtaposed portions of said eyepiece and first sleeve and sealing the same against the passage of fluid therebetween, a second tubular sleeve mounted in and longitudinally slideable relative to said first sleeve, means on said first sleeve engaging said second sleeve constraining the latter against rotation while leaving the same free to slide longitudinally relative to said first sleeve, means rotatably connecting said second sleeve with said eyepiece so that rotation of the latter to longitudinally displace the same moves said second sleeve longitudinally relative to said first sleeve, and means including an ocular setting in said second sleeve and positioned to receive light rays from the lens system in said telescope barrel, whereby rotation of said eyepiece serves to displace said eyepiece longitudinally relative to said barrel and thereby vary the distance between said ocular setting and said barrel.

4. In a medical instrument, an elongated tubular sheath adapted for insertion into a cavity in the body of a patient, means for controlling the flow of fluid along said sheath, an elongated telescope barrel connected to and extending in said sheath, said telescope barrel having a plurality of lenses mounted therein, a first tubular sleeve connected in sealed relation with and forming an extension of the proximal end of said telescope barrel, a tubular eyepiece surrounding and in threaded engagement with said first sleeve, rotation of said eyepiece serving to longitudinally displace the same relative to said first sleeve and said telescope barrel, said eyepiece having an annular recess formed about the internal surface thereof juxtaposed to said first sleeve, a pair of annular resilient members extending in said annular recess and pressed between the juxtaposed portions of said eyepiece and said first sleeve for preventing the passage of fluid therebetween, a second tubular sleeve mounted in and longitudinally slideable relative to said first sleeve, said second sleeve having a longitudinally extending slot formed therein, a pin connected to said first sleeve and extending radially inward into said slot for normally preventing rotation of said second sleeve while leaving the same free to slide longitudinally relative to said first sleeve, said second sleeve having one end thereof within said first sleeve presented toward the proximal end of said telescope barrel and the other end thereof extending externally of said first sleeve, a ring member rotatably mounted on said other end of said second sleeve and connected to said eyepiece, an annular ring-shaped locking member adapted for supporting a planar optical glass member in sealed relation against its proximal end and adjacent its distal end being in threaded engagement with said eyepiece and in abutting relation against said ring member, said locking member having an annular groove formed about its periphery, an annular resilient member positioned in said groove and pressed between said locking member and said eyepiece, and means including an ocular setting in said second sleeve positioned to receive light rays from the lens system in said telescope barrel.

References Cited in the file of this patent

UNITED STATES PATENTS

| | | |
|---|---|---|
| 1,021,809 | Wappler | Apr. 2, 1912 |
| 2,779,327 | Baker | Jan. 29, 1957 |
| 2,865,250 | Wagner | Dec. 23, 1958 |